United States Patent
Wada et al.

(10) Patent No.: US 12,116,002 B2
(45) Date of Patent: Oct. 15, 2024

(54) INFORMATION PROCESSING APPARATUS, INFORMATION PROCESSING METHOD, AND RECORDING MEDIUM

(71) Applicant: Panasonic Intellectual Property Management Co., Ltd., Osaka (JP)

(72) Inventors: Hiroyuki Wada, Kyoto (JP); Yoshiharu Imamoto, Kanagawa (JP); Toru Iwano, Osaka (JP); Takayuki Fujii, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 525 days.

(21) Appl. No.: 17/466,359

(22) Filed: Sep. 3, 2021

(65) Prior Publication Data
US 2022/0080989 A1    Mar. 17, 2022

(30) Foreign Application Priority Data
Sep. 14, 2020 (JP) .................................. 2020-154123

(51) Int. Cl.
*B60W 50/029* (2012.01)
*B60W 50/02* (2012.01)
(Continued)

(52) U.S. Cl.
CPC ...... *B60W 50/029* (2013.01); *B60W 50/0205* (2013.01); *G06F 9/45558* (2013.01);
(Continued)

(58) Field of Classification Search
CPC ............. B60W 50/029; B60W 50/0205; G06F 9/45558; G06F 21/554; G06F 21/74;
(Continued)

(56) References Cited

U.S. PATENT DOCUMENTS

2016/0378685 A1* 12/2016 Spurlock ............... G06F 12/145
711/163
2018/0239896 A1* 8/2018 Kato ....................... G06F 12/14
(Continued)

FOREIGN PATENT DOCUMENTS

JP     2019-144785     8/2019
JP     2019-185130     10/2019

OTHER PUBLICATIONS

Office Action from Japan Patent Office (JPO) in Japanese Patent Appl. No. 2020-154123, dated Mar. 5, 2024, together with an English language translation.

*Primary Examiner* — Mohammad W Reza
(74) *Attorney, Agent, or Firm* — Greenblum & Bernstein, P.L.C.

(57) ABSTRACT

An information processing apparatus includes: a communication device that communicates with an external apparatus outside the information processing apparatus; a memory that includes a protected region and an unprotected region; a processor that operates in a first mode and a second mode, the first mode being a mode in which access to the protected region and access to the unprotected region are allowed, the second mode being a mode in which access to the protected region is prohibited and access to the unprotected region is allowed; a first device controller that controls the communication device by the processor operating in the first mode; a virtual machine manager that causes one or more virtual machines to operate by the processor operating in the second mode; and a second device controller that controls the communication device by the processor operating in the second mode.

14 Claims, 16 Drawing Sheets

(51) Int. Cl.
*G06F 9/455* (2018.01)
*G06F 21/55* (2013.01)
*G06F 21/74* (2013.01)

(52) U.S. Cl.
CPC ............ *G06F 21/554* (2013.01); *G06F 21/74* (2013.01); *G06F 2009/45587* (2013.01); *G06F 2221/034* (2013.01)

(58) Field of Classification Search
CPC ..... G06F 2009/45587; G06F 2221/034; G06F 21/71; G06F 21/53
See application file for complete search history.

(56) References Cited

U.S. PATENT DOCUMENTS

| | | | |
|---|---|---|---|
| 2019/0294827 A1* | 9/2019 | Nara | G06F 12/0895 |
| 2020/0134208 A1* | 4/2020 | Pappachan | G06F 12/1009 |
| 2021/0019170 A1 | 1/2021 | Sugano | |

\* cited by examiner

FIG. 6

| State of device region | Device region |
|---|---|
| Secure | First device region |
| Non-secure | Second device region |

INFORMATION PROCESSING APPARATUS, INFORMATION PROCESSING METHOD, AND RECORDING MEDIUM

CROSS REFERENCE TO RELATED APPLICATION

The present application is based on and claims priority of Japanese Patent Application No. 2020-154123 filed on Sep. 14, 2020.

FIELD

The present disclosure relates to an information processing apparatus, an information processing method, and a recording medium.

BACKGROUND

Virtualization technology for control to cause a single apparatus to operate one or more virtual computers has been utilized. Software that is a virtualization base that causes one or more virtual computers to operate is also referred to as a hypervisor, and the one or more computers that virtually operate are also referred to as virtual machines.

There is technology for disposing, on virtualization software, a plurality of virtual machines that are monitoring targets and a virtual machine for monitoring, determining whether any of the monitoring targets has an anomaly, and outputting the determination result to the outside (see Patent Literature (PTL) 1).

CITATION LIST

Patent Literature

PTL 1: Japanese Unexamined Patent Application Publication No. 2019-144785

SUMMARY

However, the technology disclosed in PTL 1 is susceptible of a further improvement.

In view of this, the present disclosure provides, for instance, an information processing apparatus that achieves further improvement.

An information processing apparatus according to an aspect of the present disclosure includes: a device that communicates with an external apparatus outside the information processing apparatus; a memory that includes a protected region and an unprotected region; a processor that operates in a first mode and a second mode, the first mode being a mode in which access to the protected region of the memory and access to the unprotected region of the memory are allowed, the second mode being a mode in which access to the protected region of the memory is prohibited and access to the unprotected region of the memory is allowed; a first controller that controls the device by the processor operating in the first mode; a virtual machine manager that causes one or more virtual machines to operate by the processor operating in the second mode; and a second controller that controls the device by the processor operating in the second mode.

Note that these general and specific aspects may be implemented using a system, a method, an integrated circuit, a computer program, a computer-readable recording medium such as a CD-ROM, or any combination of systems, methods, integrated circuits, computer programs, or recording media.

An information processing apparatus according to an aspect of the present disclosure achieves further improvement.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 6 is an explanatory drawing illustrating an example of management information in Embodiment 2.

DESCRIPTION OF EMBODIMENTS (Underlying Knowledge Forming Basis of the Present Disclosure)

The present inventors have found the virtualization technology stated in the "Background" section has the following problems. The technology that has such problems as follows is also referred to as "related art", herein.

There is a problem that the result of determination as to whether a virtual machine, for instance, has an anomaly can be prevented from being output to the outside, due to vulnerability and/or malfunction of the virtualization software in the hypervisor or a device driver.

As an example, there is a movement that high-level vehicle service is to be provided for a user by integrating a plurality of functions of an electronic control unit (ECU) in an automobile. In such a movement, when an in-vehicle infotainment (IVI) system with which an application (also referred to as app) of a third party is installable, and an advanced driver assistance system (ADAS) for assisting automated driving of a vehicle are integrated, the result of determination as to whether an anomaly is occurring may be prevented from being output to the outside, by a malicious application of the third party attacking the virtualization software in the hypervisor or the device driver involved in communication.

If the result of determination as to whether a virtual machine, for instance, has an anomaly is prevented from being output to the outside, the ECU cannot execute processing for addressing an anomaly in accordance with an instruction from an external apparatus, which leads to a problem in the driving of the vehicle.

In view of this, the present disclosure provides an information processing apparatus that inhibits prevention of outputting a monitoring result to the outside.

Figure 1:
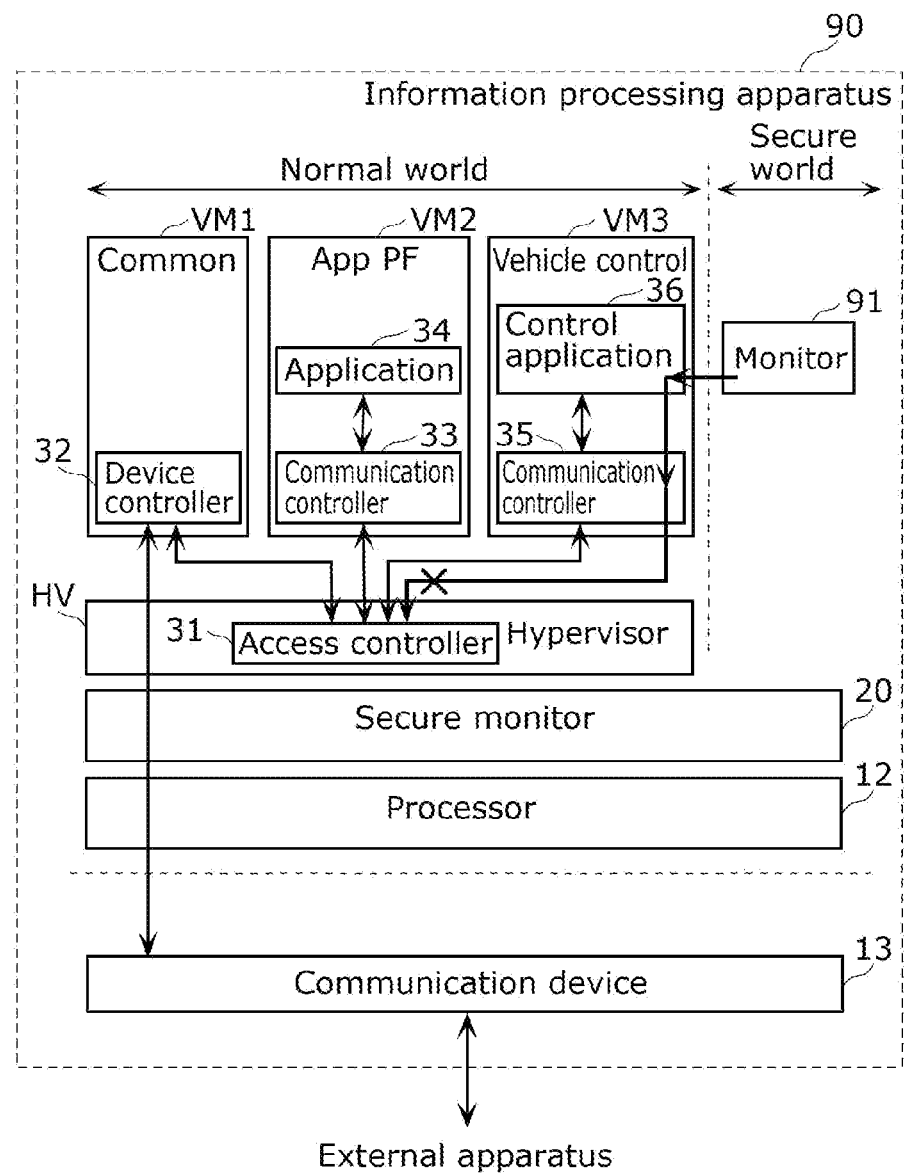
FIG. 1 is a schematic diagram conceptually illustrating a configuration of an information processing apparatus according to related art.

FIG. 1 is a schematic diagram conceptually illustrating a configuration of information processing apparatus 90 according to related art.

As illustrated in FIG. 1, information processing apparatus 90 includes processor 12 and communication device 13.

Processor 12 is a processing device that can operate in execution modes including a secure mode and a normal mode. An execution environment in which the processor is operating in the secure mode is also referred to as a secure world, and an execution environment in which the processor is operating in the normal mode is also referred to as a normal world.

Communication device 13 communicates with an external apparatus outside the information processing apparatus (also simply referred to as an external device). Communication device 13 includes a connector compatible with a predetermined format, and communicates with the external apparatus by transmitting and receiving electrical signals in the predetermined format via the connector.

Further, information processing apparatus 90 includes secure monitor 20 that is a function executed by the processor.

Secure monitor 20 controls the execution modes of processor 12. Specifically, secure monitor 20 determines whether processor 12 operates in the secure mode or in the normal mode, and controls the execution modes of processor 12 based on the determination.

In information processing apparatus 90, hypervisor HV is executed in the normal mode, and virtual machines VM1, VM2, and VM3 operate on hypervisor HV.

Virtual machine VM1 is a common virtual machine (VM1 is labelled with "Common" in FIG. 1). Virtual machine VM1 provides functions commonly used in information processing apparatus 90. Virtual machine VM1 causes device controller 32 that controls communication device 13 to operate.

Virtual machine VM2 is an application platform virtual machine (VM2 is labelled with "App PF" in FIG. 1). Virtual machine VM2 causes application 34 (for example, mobility as a service (MaaS) application) of a third party to operate, and includes communication controller 33 that controls, for instance, protocol processing related to communication with the external apparatus.

Virtual machine VM3 is a vehicle control virtual machine (VM3 is labelled with "Vehicle control" in FIG. 1). Virtual machine VM3 causes control application 36 for assisting driving of a vehicle (for example, an advanced driver-assistance systems (ADAS) application) to operate, and includes communication controller 35 that controls protocol processing related to communication with the external apparatus.

Hypervisor HV includes access controller 31. Access controller 31 is a functional unit that is connected to each of communication controller 33 of virtual machine VM2 and communication controller 35 of virtual machine VM3, is connected to device controller 32 of virtual machine VM1, and controls access for communication.

In information processing apparatus 90, monitor 91 operates in the secure mode. Monitor 91 monitors memory regions allocated to the virtual machines and hypervisor HV operating in the normal mode, and notifies the external apparatus with the result of determination as to whether any of the memory regions has an anomaly. If the determination result shows that an anomaly is occurring, the external apparatus gives, by communication, an instruction on processing for addressing the anomaly (for example, processing for changing the anomalous value to a normal value or processing for safely stopping a vehicle), and causes information processing apparatus 90 to execute the instruction.

Monitor 91 uses device controller 32 included in virtual machine VM1 to communicate with the external apparatus. Specifically, monitor 91 communicates with the external apparatus using a communication path running through communication controller 35 of virtual machine VM3, access controller 31 of hypervisor HV, device controller 32 of virtual machine VM1, and communication device 13.

In this case, there is a problem that if a device on the communication path (for example, access controller 31 of hypervisor HV or device controller 32 of virtual machine VM1) starts performing an anomalous operation due to being attacked by a malicious application, monitor 91 may be prevented from outputting the result of determination as to whether a memory region has an anomaly. Monitor 91 cannot perform processing for addressing the anomaly in the memory region in accordance with an instruction from the outside, which results in a problem in the driving of a vehicle.

In view of this, the present disclosure provides, for instance, an information processing apparatus that inhibits prevention of outputting a monitoring result to the outside.

An information processing apparatus according to an aspect of the present disclosure includes: a device that communicates with an external apparatus outside the information processing apparatus; a memory that includes a protected region and an unprotected region; a processor that operates in a first mode and a second mode, the first mode being a mode in which access to the protected region of the memory and access to the unprotected region of the memory are allowed, the second mode being a mode in which access to the protected region of the memory is prohibited and access to the unprotected region of the memory is allowed; a first controller that controls the device by the processor operating in the first mode; a virtual machine manager that causes one or more virtual machines to operate by the processor operating in the second mode; and a second controller that controls the device by the processor operating in the second mode.

According to the above aspect, the information processing apparatus can control the device by the processor operating in the first mode so as to communicate with the external apparatus. If the processor can only control the device by operating in the second mode and communicate with the external apparatus, in case the device or a function used for communication using the device is attacked by a malicious application, communication with the external apparatus is prevented. Such a malicious application is assumed to operate in the second mode. In contrast, according to the information processing apparatus according to the above aspect, the processor operates in the first mode to control the device so as to communicate with the external apparatus, and thus prevention of communication by a malicious application that operates in the second mode can be inhibited. Accordingly, the information processing apparatus according to the above aspect can inhibit prevention of outputting a monitoring result to the outside.

For example, the information processing apparatus may further include: a switch that switches, by the processor operating in the first mode, control of the device from control by the second controller to control by the first controller.

According to the above aspect, the information processing apparatus can switch from a state of controlling the device in the second mode to a state of controlling the device in the first mode, and thus can perform operation for communication in the second more at an ordinary time and controlling the device in the first mode when it is necessary to control the device in the first mode. Accordingly, this yields advantageous effects of performing processing of controlling the device in the first mode using less computer resources and/or consuming less power. Thus, the information processing apparatus can inhibit prevention of outputting a monitoring result to the outside while using less computer resources and/or consuming less power.

For example, the information processing apparatus may further include: a monitor that, by the processor operating in the first mode, monitors a region of the memory as a monitoring target, and determines whether the monitoring target has an anomaly, the region being allocated to the virtual machine manager. When the monitor determines that the monitoring target has an anomaly, the switch may switch control of the device when the monitor communicates with the external apparatus from control by the second controller to control by the first controller.

According to the above aspect, when a region of the memory that is a monitoring target has an anomaly, the information processing apparatus switches the state to a state of controlling the device in the first mode, and thus can more securely transmit information indicating that an anomaly is occurring to the external apparatus. Accordingly, the information processing apparatus can more securely inhibit prevention of outputting a monitoring result to the outside.

For example, the switch may further perform control to prohibit the control of the device by the second controller when the switch switches from the control by the second controller to the control by the first controller.

According to the above aspect, when switching the state to a state of controlling the device in the first mode, the information processing apparatus prohibits controlling the device in the second mode, and thus can inhibit communication executed by controlling the device in the first mode from being prevented by communication executed by controlling the device in the second mode. Accordingly, the information processing apparatus can more securely inhibit prevention of outputting a monitoring result to the outside.

For example, the first controller may control the device using a first device region included in the protected region of the memory, and the second controller may control the device using a second device region included in the unprotected region of the memory.

According to the above aspect, the information processing apparatus controls the device in the first mode using the protected region of the memory, and controls the device in the second mode using the unprotected region of the memory. Accordingly, the information processing apparatus can inhibit prevention of outputting a monitoring result to the outside.

For example, the first controller may control the device using a second device region included in the unprotected region of the memory, and the second controller may control the device using the second device region of the memory.

According to the above aspect, the information processing apparatus controls the device in the first mode or the second mode using the unprotected region of the memory. Accordingly, the information processing apparatus can inhibit prevention of outputting a monitoring result to the outside.

For example, the information processing apparatus may further include: an application that, by the processor operating in the second mode, performs predetermined processing and adds a digital signature to data that the application is to transmit to the external apparatus; and a signature verifier that, by the processor operating in the first mode, receives the data to which the application has added the digital signature, and transmits the data to the external apparatus when the digital signature is successfully verified.

According to the above aspect, the information processing apparatus verifies in the first mode a digital signature added to data by the application that operates in the second mode and transmits data successfully verified, and thus can transmit data that an authenticated application is to transmit, by controlling the device in the first mode. Thus, the information processing apparatus can inhibit both prevention of outputting a monitoring result to the outside and prevention of communication by an authenticated application.

For example, the information processing apparatus may further include: an application that, by the processor operating in the second mode, performs predetermined processing and generates one or more data items that the application is to transmit to the external apparatus; and a behavior verifier that, by the processor operating in the first mode, receives the one or more data items generated by the application, obtains, from the protected region of the memory, an appropriate behavior condition defining appropriate behavior of the application concerning communication, and when the behavior verifier determines that at least one data item out of the one or more data items satisfies the appropriate behavior condition, transmits the at least one data item to the external apparatus.

According to the above aspect, the information processing apparatus verifies, in the first mode, behavior of the application that operates in the second mode and transmits data for which verification has been successful, and thus can transmit data that an authenticated application is to transmit, by controlling the device in the first mode. Thus, the information processing apparatus can inhibit both prevention of outputting a monitoring result to the outside and communication by an authenticated application.

For example, the information processing apparatus may further include: a vehicle controller that controls a vehicle. When the switch switches from the control by the second controller to the control by the first controller, the vehicle controller may obtain, from the protected region of the memory, control information for fallback control of the vehicle, and control the vehicle in accordance with the control information obtained.

According to the above aspect, the information processing apparatus can further perform fallback control on a vehicle when switching the control of the device from the first mode to the second mode. Accordingly, the vehicle can be controlled so as to safely stop the vehicle. Accordingly, the information processing apparatus can inhibit prevention of outputting a monitoring result to the outside, while safely stopping the vehicle.

For example, the processor may switch between operation in the first mode and operation in the second mode in a time-sharing manner.

According to the above aspect, the information processing apparatus can inhibit prevention of outputting a monitoring result to the outside using the processor that switches between operation in the first mode and operation in the second mode in a time-sharing manner.

For example, the processor may include a plurality of cores, at least one of the plurality of cores may operate in the first mode, and at least one of the plurality of cores that is not operating in the first mode may operate in the second mode.

According to the above aspect, the information processing apparatus can inhibit prevention of outputting a monitoring result to the outside using the processor that includes a plurality of cores including a core that operates in the first mode and a core that operates in the second mode.

For example, the information processing apparatus may be an electronic control unit (ECU) provided in a vehicle.

According to the above aspect, an ECU that is the information processing apparatus can inhibit prevention of outputting a monitoring result to the outside.

An information processing method according to an aspect of the present disclosure is an information processing method executed by an information processing apparatus that includes: a device that communicates with an external apparatus outside the information processing apparatus; a memory that includes a protected region and an unprotected region; and a processor that operates in a first mode and a second mode, the first mode being a mode in which access to the protected region of the memory and access to the unprotected region of the memory are allowed, the second mode being a mode in which access to the protected region of the memory is prohibited and access to the unprotected region of the memory is allowed. The information processing method includes: controlling the device by the processor operating in the first mode; causing one or more virtual machines to operate by the processor operating in the second mode; and controlling the device by the processor operating in the second mode.

According to the above aspect, advantageous effects similarly to those yielded by the information processing apparatus can be produced.

A recording medium according to an aspect of the present disclosure is a non-transitory computer-readable recording medium having recorded thereon a program that causes a computer to execute the information processing method.

According to the above aspect, advantageous effects similarly to those yielded by the information processing apparatus can be produced.

Note that these general and specific aspects may be implemented using a system, a method, an integrated circuit, a computer program, a computer-readable recording medium such as a CD-ROM, or any combination of systems, methods, integrated circuits, computer programs, or recording media.

The following describes embodiments, with reference to the drawings.

Note that the embodiments described below each show a general or specific example. The numerical values, shapes, materials, elements, the arrangement and connection of the elements, steps, and the processing order of the steps, for instance, described in the following embodiments are examples, and thus are not intended to limit the present disclosure. Among the elements in the following embodiments, elements not recited in any of the independent claims defining the most generic concept are described as arbitrary elements.

Embodiment 1

The present embodiment describes, for instance, an information processing apparatus that inhibits prevention of outputting a monitoring result to the outside.

Figure 2:
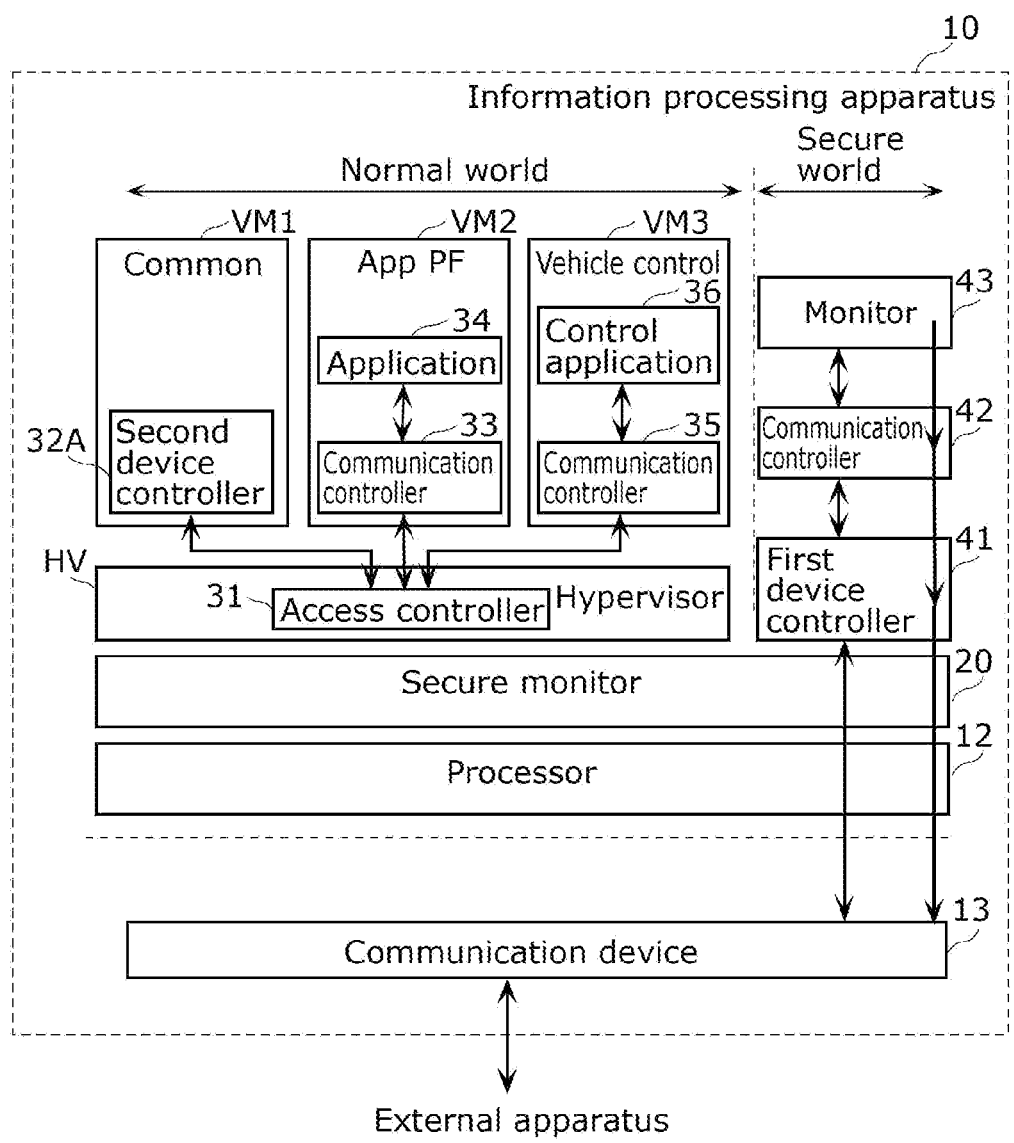
FIG. 2 is a schematic diagram conceptually illustrating a configuration of an information processing apparatus according to Embodiment 1.

FIG. 2 is a schematic diagram conceptually illustrating a configuration of information processing apparatus 10 according to the present embodiment.

As illustrated in FIG. 2, information processing apparatus includes processor 12 and communication device 13, similarly to information processing apparatus 90 according to the related art.

Processor 12 is a processing device that can operate in execution modes including a secure mode and a normal mode. Processor 12 may operate in the secure mode and the normal mode in a time-sharing manner, or if processor 12 includes a plurality of cores, one or more of the cores may operate in the secure mode, and one or more remaining cores of the plurality of cores may operate in the normal mode. Note that information processing apparatus 10 is, for example, an ECU that is provided in a vehicle and connected to a vehicle network to control the vehicle, but the present embodiment is not limited thereto.

Note that control of the execution environments of the secure mode and the normal mode is typically referred to as trusted execution environment (TEE). For example, TEE is implemented by TrustZone technology which is a standard function in a Cortex-A family in an ARM central processing unit (CPU). Furthermore, TEE can also be implemented by the secure enclave processor (SEP) of Apple or TitanM of Google, for instance.

Communication device 13 communicates with an external apparatus outside the information processing apparatus (also simply referred to as an external device). Communication device 13 includes a connector compatible with a predetermined format, and communicates with the external apparatus by transmitting and receiving electrical signals in the predetermined format via the connector. More specifically, communication device 13 may be a device used to communicate with the external apparatus, such as Control Area Network (CAN), Diagnostic Communication (Diag), Universal Asynchronous Receiver/Transmitter (UART), Ethernet, Cellular, Bluetooth, or Universal Serial Bus (USB).

Further, information processing apparatus 10 includes secure monitor 20 that is a function executed by processor 12.

Secure monitor 20 controls the execution modes of processor 12. Specifically, secure monitor 20 determines whether processor 12 operates in the secure mode or in the normal mode, and controls the execution modes of processor 12 based on the determination.

Processor 12 executes hypervisor HV in the normal mode, and causes virtual machines VM1, VM2, and VM3 to operate on hypervisor HV. Virtual machine VM1 causes second device controller 32A (also referred to as a second controller) to operate, virtual machine VM2 causes communication controller 33 and application 34 to operate, and virtual machine VM3 causes communication controller 35 and control application 36 to operate. Note that second device controller 32A may be caused to operate on, for instance, hypervisor HV executed in the normal mode, and the present embodiment is not particularly limited thereto.

Processor 12 causes first device controller 41, communication controller 42, and monitor 43 to operate in the secure mode.

First device controller 41 is a functional unit that operates in the secure mode and controls communication device 13. First device controller 41 may also be referred to as a first controller.

Communication controller 42 is a functional unit that controls communication of information processing apparatus 10, which controls communication device 13, with the external apparatus.

Monitor 43 is a functional unit that monitors memory regions allocated to the virtual machines and hypervisor HV operating in the normal world, and notifies the external apparatus with the result of determination as to whether an anomaly is occurring, similarly to monitor 91 according to the related art.

Monitor 43 communicates with the external apparatus, using first device controller 41 operating in the secure mode. Thus, monitor 43 communicates with the external apparatus, using a communication path running through communication controller 42 and first device controller 41 that operate in the secure mode and communication device 13.

Accordingly, monitor 43 communicates with the external apparatus without using access controller 31 and second device controller 32A that operate in the normal world, and thus prevention of outputting a result of determination as to whether an anomaly is occurring to the outside is inhibited.

The following more specifically describes a functional configuration of information processing apparatus 10.

Figure 3:
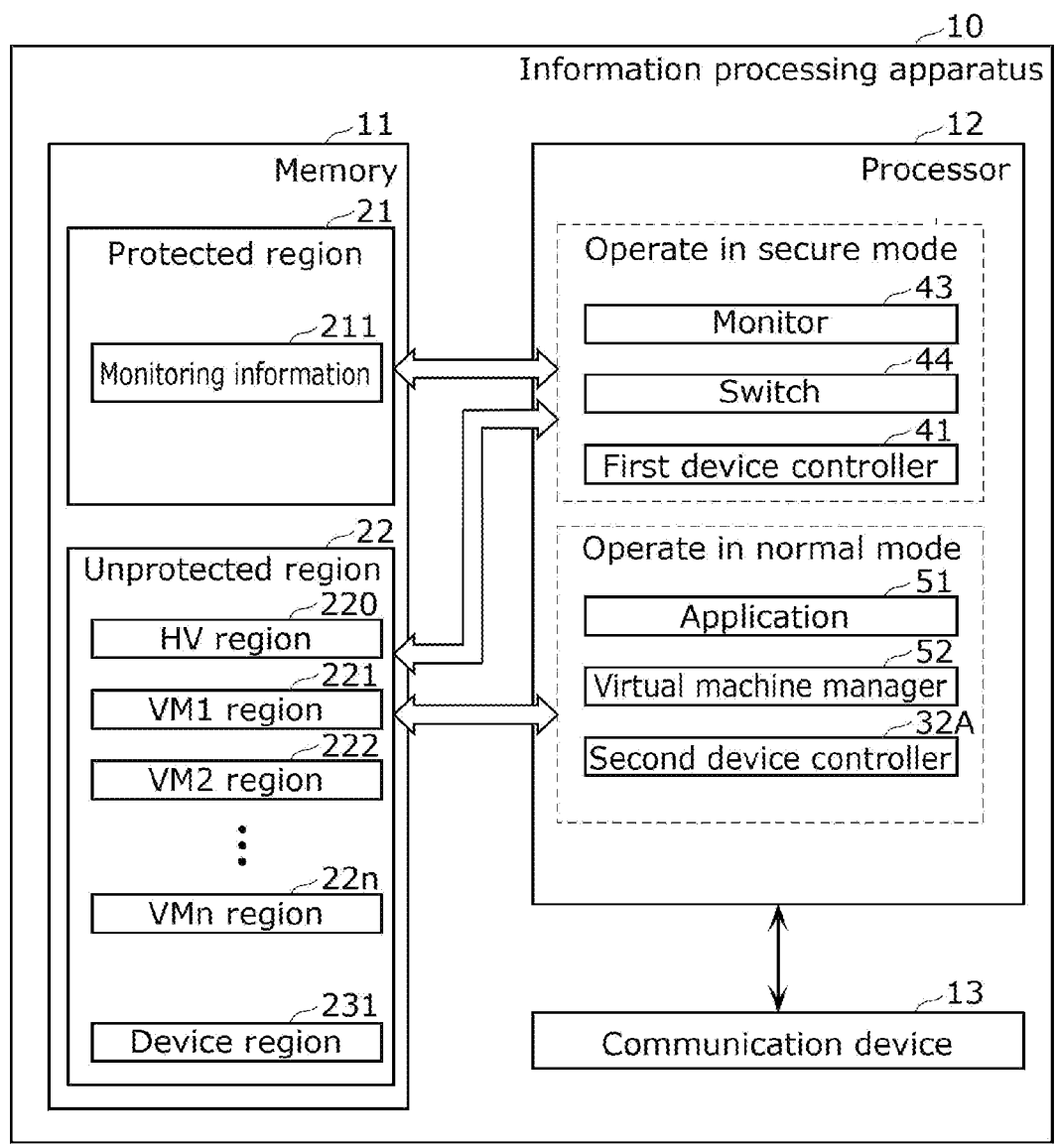
FIG. 3 is a schematic diagram illustrating a functional configuration of the information processing apparatus according to Embodiment 1.

FIG. 3 is a schematic diagram illustrating a functional configuration of information processing apparatus 10 according to the present embodiment.

As illustrated in FIG. 3, information processing apparatus 10 includes memory 11, processor 12 and communication device 13.

Memory 11 includes protected region 21 and unprotected region 22. Protected region 21 can be accessed only when processor 12 is operating in the secure mode. Unprotected region 22 can be accessed when processor 12 is operating in the secure mode and when processor 12 is operating in the normal mode. Memory 11 stores, for example, communication control settings (such as a communication speed), control messages, commands, input and output parameters, and data.

Note that here, a state in which n virtual machines are operating on hypervisor HV is described as an example. It is sufficient if n is 1 or greater.

Protected region 21 includes monitoring information 211.

Monitoring information 211 indicates a memory region that is a monitoring target, and a condition showing that a value stored in the memory region is appropriate (also referred to as an appropriateness condition).

Unprotected region 22 includes HV region 220 that is managed by hypervisor HV, regions managed by the n virtual machines, or specifically, VM1 region 221 managed by virtual machine VM1, VM2 region 222 managed by virtual machine VM2, . . . , and VMn region 22n managed by virtual machine VMn.

Further, unprotected region 22 includes device region 231. Device region 231 is a memory region used by processor 12 to control communication device 13.

Processor 12 is a processing device that operates in one of the execution modes including the secure mode and the normal mode. Specifically, processor 12 operates in one of the execution modes including the secure mode (that is, a first mode) in which access to protected region 21 of memory 11 and access to unprotected region 22 thereof are allowed, and the normal mode (that is, a second mode) in which access to protected region 21 of memory 11 is prohibited and access to unprotected region 22 thereof is allowed.

Processor 12 may switch between operation in the secure mode and operation in the normal mode in a time-sharing manner. Processor 12 may include a plurality of cores, and at least one of the cores may operate in the secure mode, and at least one of cores not operating in the secure mode among the plurality of cores may operate in the normal mode.

Processor 12 executes a program using memory 11 to implement functional units such as monitor 43, switch 44, first device controller 41, application 51, virtual machine manager 52, and second device controller 32A.

Here, monitor 43, switch 44, and first device controller 41 are functional units implemented by processor 12 operating in the secure mode. Application 51, virtual machine manager 52, and second device controller 32A are functional units implemented by processor 12 operating in the normal mode.

Monitor 43 is a functional unit that monitors, as a monitoring target, one virtual machine out of one or more virtual machines or a region of memory 11 allocated to virtual machine manager 52. Monitor 43 obtains monitoring information 211, and monitors a value stored in a memory region that is a monitoring target indicated by monitoring information 211 obtained. Monitor 43 determines whether the value stored in the memory region that is a monitoring target satisfies the appropriateness condition indicated by monitoring information 211, and determines that the monitoring target has an anomaly if the value does not satisfy the condition.

Switch 44 is a functional unit that switches control of communication device 13 when monitor 43 communicates with the external apparatus between control by first device controller 41 and control by second device controller 32A. Specifically, switch 44 switches control of communication device 13 from control by second device controller 32A to control by first device controller 41. More specifically, when monitor 43 determines that a monitoring target has an anomaly, switch 44 switches control of communication device 13 when monitor 43 communicates with the external apparatus from control by second device controller 32A to control by first device controller 41.

First device controller 41 is a functional unit that controls communication device 13. First device controller 41 controls communication device 13 using device region 231 when first device controller 41 is to control communication device 13.

Application 51 is application software that carries out a predetermined function. Application 51 corresponds to application 34 and control application 36 illustrated in FIG. 2.

Virtual machine manager 52 is a functional unit that causes one or more virtual machines to operate, and corresponds to hypervisor HV. Virtual machine manager 52 is implemented by using a memory region of HV region 220. Virtual machine manager 52 causes one or more virtual machines using VM1 region 221, VM2 region 222, . . . , and VMn region 22n as memory regions of the one or more virtual machines.

Second device controller 32A is a functional unit that controls communication device 13. Second device controller 32A controls communication device 13 using device region 231 when first device controller 41 is to control communication device 13.

Thus, first device controller 41 and second device controller 32A control communication device 13 both using device region 231 (corresponding to a second device region) included in unprotected region 22.

Figure 4:
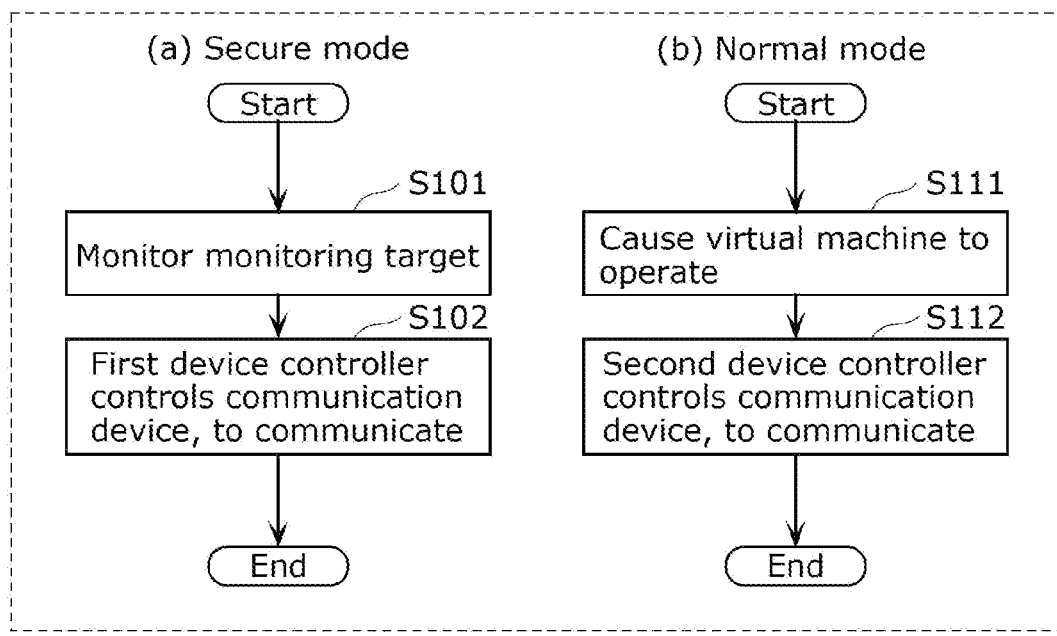
FIG. 4 illustrates flowcharts illustrating processing performed by the information processing apparatus according to Embodiment 1.

FIG. 4 illustrates flowcharts illustrating processing performed by information processing apparatus 10 according to the present embodiment. In FIG. 4, (a) is a flowchart illustrating processing in the secure mode, whereas (b) is a flowchart illustrating processing in the normal mode.

When processor 12 switches between the secure mode and the normal mode in a time-sharing manner, the processing in (a) of FIG. 4 and the processing in (b) of FIG. 4 alternately proceed. When one or more of the plurality of cores of processor 12 operate in the secure mode and one or more remaining cores operate in the normal mode, the one or more of the plurality of cores that operate in the secure mode execute the processing in (a), and in parallel thereto, the one or more remaining cores that operate in the normal mode execute the processing in (b).

The following describes processing that processor 12 executes in the secure mode.

As illustrated in (a) of FIG. 4, monitor 43 monitors a memory region that is a monitoring target in step S101.

In step S102, first device controller 41 controls communication device 13, to communicate with the external apparatus. This communication includes, for example, transmitting information indicating a monitoring result obtained in step S101 to the external apparatus and/or receiving instruction information that the external apparatus transmits in response to the transmitted information.

Upon the end of step S102, a series of the processes in (a) of FIG. 4 ends. The process in step S101 may be executed again.

Next, the processing that processor 12 executes in the normal mode is to be described.

As illustrated in (b) of FIG. 4, virtual machine manager 52 causes a virtual machine to operate in step S111.

In step S112, second device controller 32A controls communication device 13, to communicate with the external apparatus. This communication includes, for example, application 51 transmitting information to the external apparatus and/or application 51 receiving information transmitted by the external apparatus.

Upon the end of step S112, a series of the processes in (b) of FIG. 4 ends. The process in step S111 may be executed again.

Information processing apparatus 10 can inhibit prevention of outputting a monitoring result to the outside, by executing the processing illustrated in (a) and (b) of FIG. 4.

Embodiment 2

The present embodiment describes another aspect of, for instance, an information processing apparatus that inhibits prevention of outputting a monitoring result to the outside.

Information processing apparatus 10A according to the present embodiment performs control to prohibit communication using a device controller (a second device controller) in a normal mode when it is determined that a monitoring target has an anomaly.

Information processing apparatus 10A according to the present embodiment has a similar configuration to that of information processing apparatus 10 according to Embodiment 1. The following mainly describes portions different from information processing apparatus 10 according to Embodiment 1.

Figure 5:
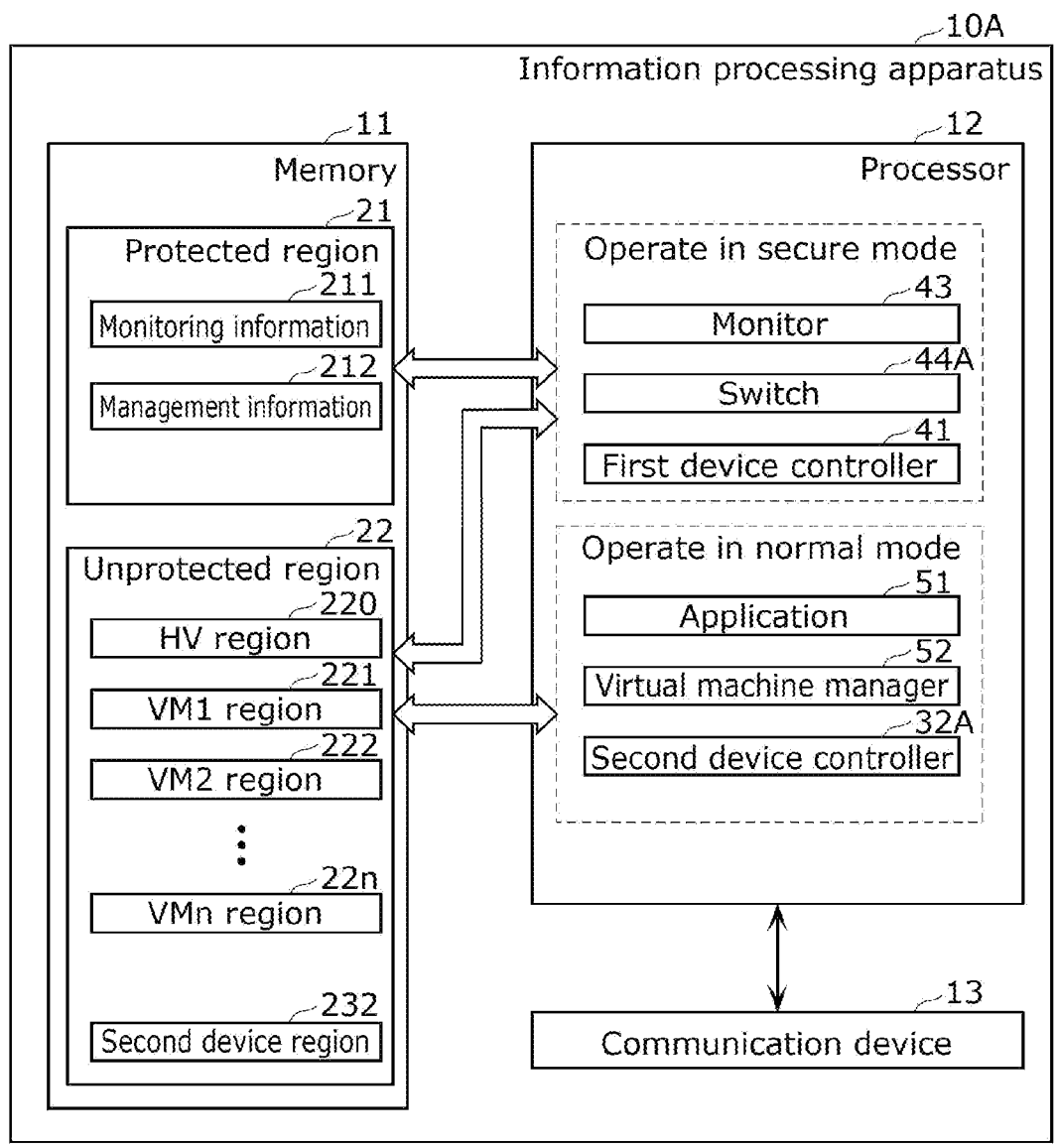
FIG. 5 is a schematic diagram illustrating a functional configuration of an information processing apparatus according to Embodiment 2.

FIG. 5 is a schematic diagram illustrating a functional configuration of information processing apparatus 10A according to the present embodiment. FIG. 6 is an explanatory drawing illustrating an example of management information 212 in the present embodiment.

As illustrated in FIG. 5, information processing apparatus 10A includes memory 11, processor 12, and communication device 13.

Memory 11 includes protected region 21 and unprotected region 22.

Protected region 21 includes monitoring information 211 and management information 212. Protected region 21 is allowed to include first device region 213 by the control of switch 44A (see (b) of FIG. 7).

Management information 212 is for managing states of device regions. The state of a device region can be dynamically and selectively changed to one of "secure" and "non-secure". Management information 212 is changed by switch 44A, for example.

The state of a device region is to be described with reference to FIG. 6.

When the state of a device region is secure, access from processor 12 operating in the secure mode to the device region is allowed, whereas access from processor 12 operating in the normal mode to the device region is prohibited. Thus, if the state of the device region is secure, the device region corresponds to a region disposed in protected region 21.

If the state of a device region is non-secure, access from processor 12 operating in the secure mode and in the normal mode to the device region is allowed. Thus, if the state of the device region is non-secure, the device region corresponds to a region disposed in unprotected region 22.

Unprotected region 22 includes HV region 220, VM1 region 221, VM2 region 222, . . . , and VMn region 22n.

Further, unprotected region 22 includes second device region 232. Second device region 232 corresponds to device region 231 in Embodiment 1, and is a memory region used by processor 12 to control communication device 13.

Switch 44A in the present embodiment is a functional unit that switches, by changing the state of a device region, control of communication device 13 when monitor 43 communicates with the external apparatus between control by first device controller 41 and control by second device controller 32A (see FIG. 2). Accordingly, control of communication device 13 is prohibited when processor 12 is operating in the normal mode, and control of communication device 13 is allowed when processor 12 is operating in the secure mode.

Figure 7:
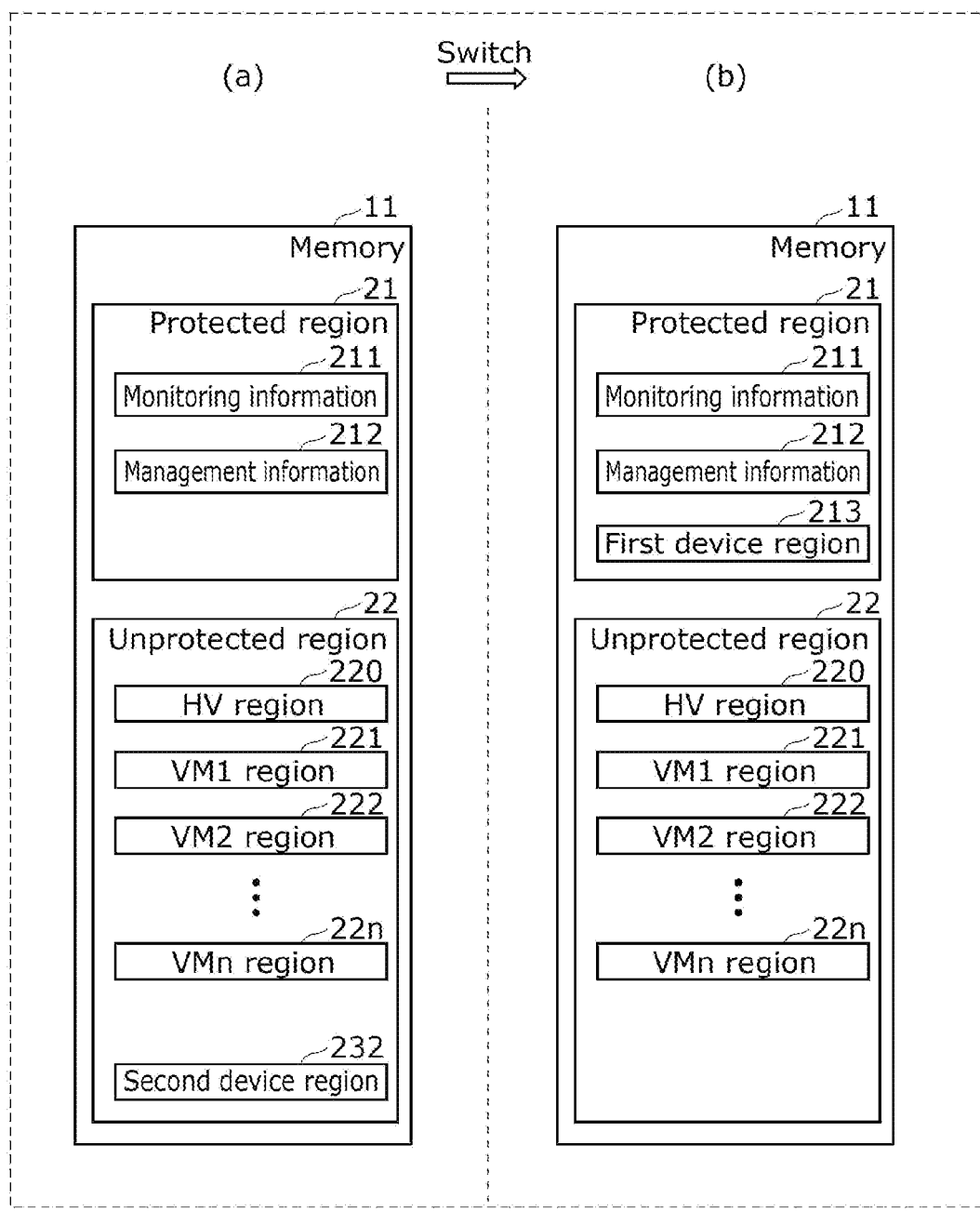
FIG. 7 is an explanatory drawing illustrating locations of device regions in a memory in Embodiment 2.

FIG. 7 is an explanatory drawing illustrating locations of device regions in memory 11 in the present embodiment.

Part (a) of FIG. 7 illustrates a first location of a device region in memory 11. The location illustrated in (a) of FIG. 7 is a location of a device region in memory 11 when monitor 43 determines that a monitoring target has no anomaly. In other words, the location illustrated in (a) of FIG. 7 is a location in memory 11 before switch 44A switches the state.

Part (a) of FIG. 7 shows the same state as that of memory 11 illustrated in FIG. 5, and a device region is located in unprotected region 22 as second device region 232.

Part (b) of FIG. 7 illustrates a second location of a device region in memory 11. The location illustrated in (b) of FIG. 7 is a location of a device region in memory 11 when monitor 43 determines that a monitoring target has an anomaly. In other words, the location illustrated in (b) of FIG. 7 is a location in memory 11 after switch 44A switches the state.

As illustrated in (b) of FIG. 7, after switch 44A switching the state, a device region is located in protected region 21 as first device region 213. First device region 213 corresponds to device region 231 in Embodiment 1, and is a memory region used by processor 12 to control communication device 13. First device region 213 is generated by the state of second device region 232 in (a) of FIG. 7 being changed from non-secure to secure.

In this manner, control of communication device 13 can be prohibited when processor 12 is operating in the normal mode.

Processing performed by information processing apparatus 10A having a configuration as above is to be described.

Figure 8:
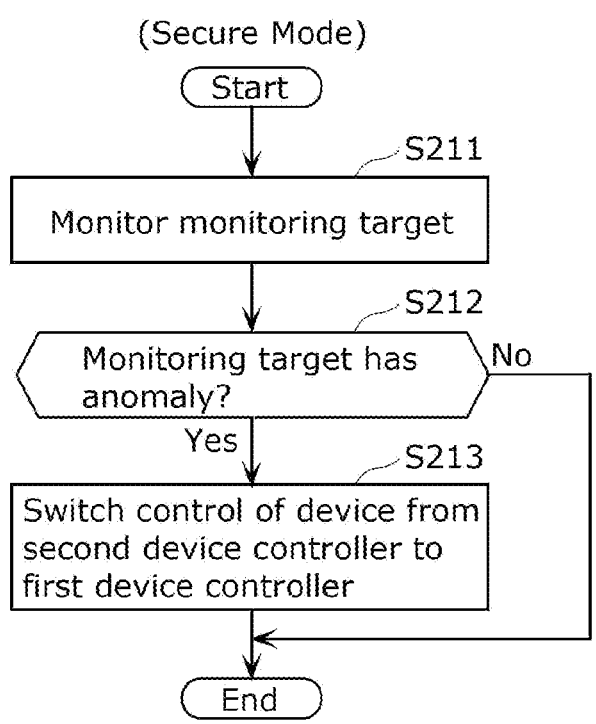
FIG. 8 is a flowchart illustrating processing performed by the information processing apparatus according to Embodiment 2.

FIG. 8 is a flowchart illustrating processing performed by information processing apparatus 10A according to the present embodiment.

As illustrated in FIG. 8, monitor 43 monitors a memory region that is a monitoring target in step S211.

In step S212, monitor 43 determines whether the memory region that is a monitoring target in the monitoring in step S211 has an anomaly. If monitor 43 determines that an anomaly is occurring (Yes in step S212), the processing proceeds to step S213, otherwise (No in step S212), a series of the processes illustrated in FIG. 8 ends.

In step S213, switch 44A switches control of the device from control by second device controller 32A to control by first device controller 41. Upon the end of step S213, information processing apparatus 10A ends the series of the processes illustrated in FIG. 8.

When information processing apparatus 10A determines that a monitoring target has an anomaly by performing the series of the processes illustrated in FIG. 8, information processing apparatus 10A performs control to prohibit control of communication device 13 by the device controller that operates in the normal mode, and to allow communication by the device controller that operates in the secure mode controlling communication device 13. Accordingly, this avoids communication by the device controller that operates in the secure mode being prevented by communication by the device controller that operates in the normal mode, and prevention of outputting a monitoring result to the outside is further inhibited.

Embodiment 3

The present embodiment describes another aspect of, for instance, an information processing apparatus that inhibits prevention of outputting a monitoring result to the outside.

Information processing apparatus 10B according to the present embodiment performs control to prohibit communication using a device controller (the second device controller) in a normal mode when it is determined that a monitoring target has an anomaly.

Figure 9:
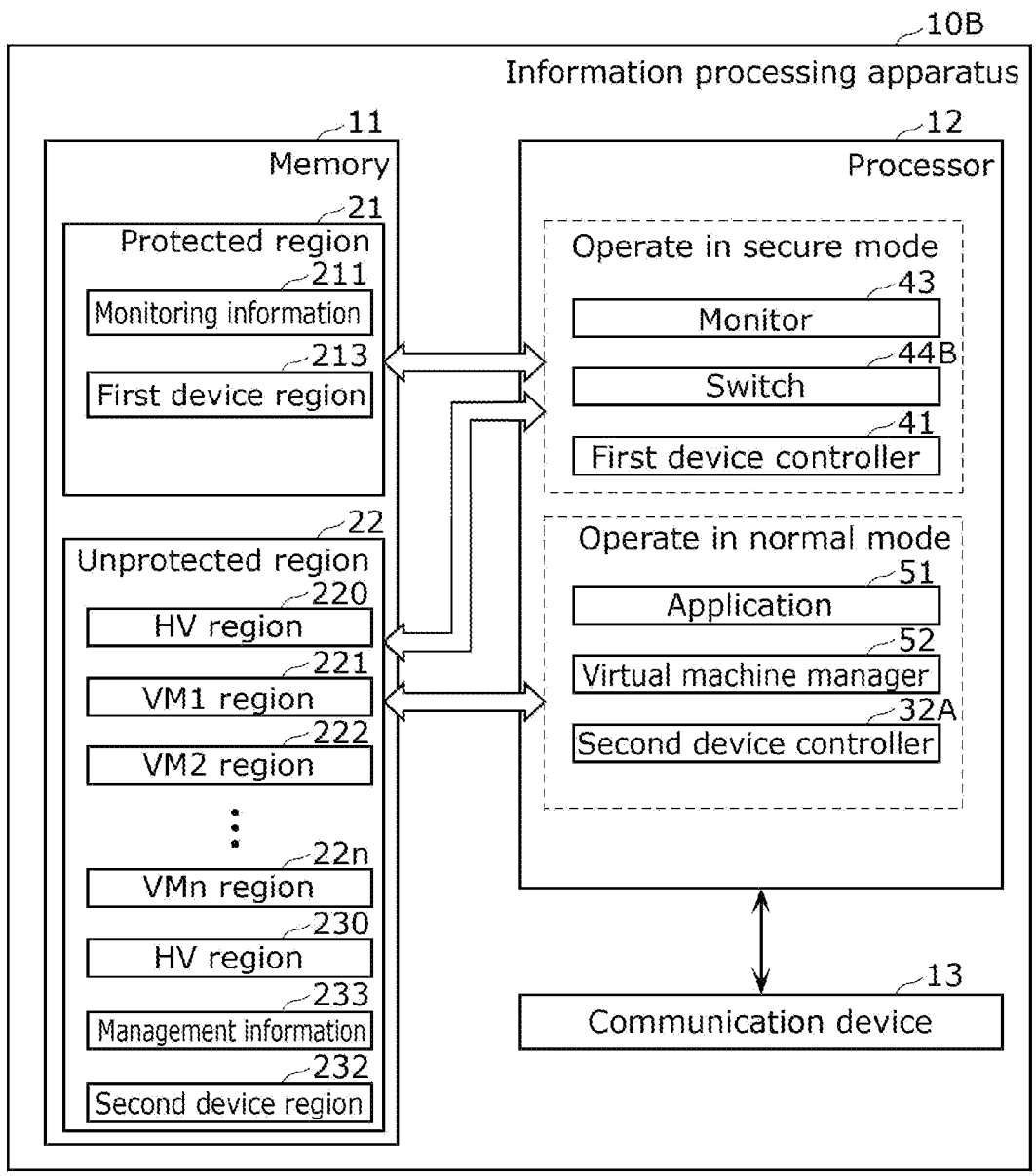
FIG. 9 is a schematic diagram illustrating a functional configuration of an information processing apparatus according to Embodiment 3.
Figure 10:
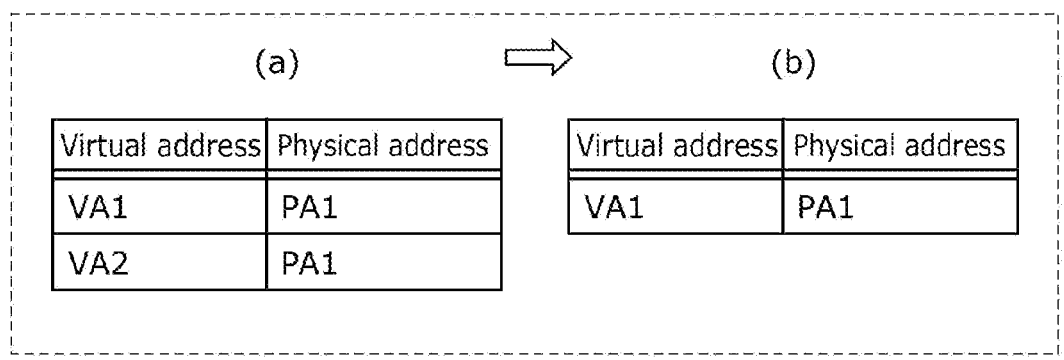
FIG. 10 is an explanatory drawing illustrating an example of management information in Embodiment 3.

FIG. 9 is a schematic diagram illustrating a functional configuration of information processing apparatus 10B according to the present embodiment. FIG. 10 is an explanatory drawing illustrating an example of management information 233 in the present embodiment.

As illustrated in FIG. 9, information processing apparatus 10B includes memory 11, processor 12, and communication device 13.

Memory 11 includes protected region 21 and unprotected region 22.

Protected region 21 includes monitoring information 211 and first device region 213.

First device region 213 corresponds to device region 231 in Embodiment 1, and is a memory region used by processor 12 to control communication device 13.

Unprotected region 22 includes HV region 220, VM1 region 221, VM2 region 222, . . . , VMn region 22n, management information 233, and second device region 232.

Management information 233 indicates correspondence between virtual addresses and physical addresses. Here, a virtual address is used when virtual machine VM1, for instance, accesses the memory, whereas a physical address is an actual address in memory 11. Management information 233 is used to convert a virtual address into a physical address, for example.

Second device region 232 corresponds to device region 231 in Embodiment 1, and is a memory region used by processor 12 to control communication device 13.

Switch 44B is a functional unit that switches control of communication device 13 when monitor 43 communicates with an external apparatus between control by first device controller 41 and control by second device controller 32A (see FIG. 2). Further, switch 44B changes management information 233 to prohibit control of communication device 13 when processor 12 is operating in the normal mode, and to control communication device 13 when processor 12 is operating in the secure mode.

Management information 233 is to be described with reference to FIG. 10.

As illustrated in (a) of FIG. 10, management information 233 associates a virtual address and a physical address. Here, a virtual address means an address in a memory space used by a virtual machine, whereas a physical address means an address in memory 11.

In management information 233, virtual address VA1 is a virtual address of first device region 213, virtual address VA2 is a virtual address of second device region 232, and physical address PA1 is a physical address of communication device 13.

According to management information 233 illustrated in (a) of FIG. 10, first device region 213 and second device region 232 can be both used to control communication device 13.

Here, if switch 44B makes a change to eliminate association between virtual address VA2 and physical address PA1, the state changes to the one as illustrated in (b) of FIG. 10, so that control of communication device 13 using first device region 213 is allowed, and furthermore control of communication device 13 using second device region 232 is prohibited.

Figure 11:
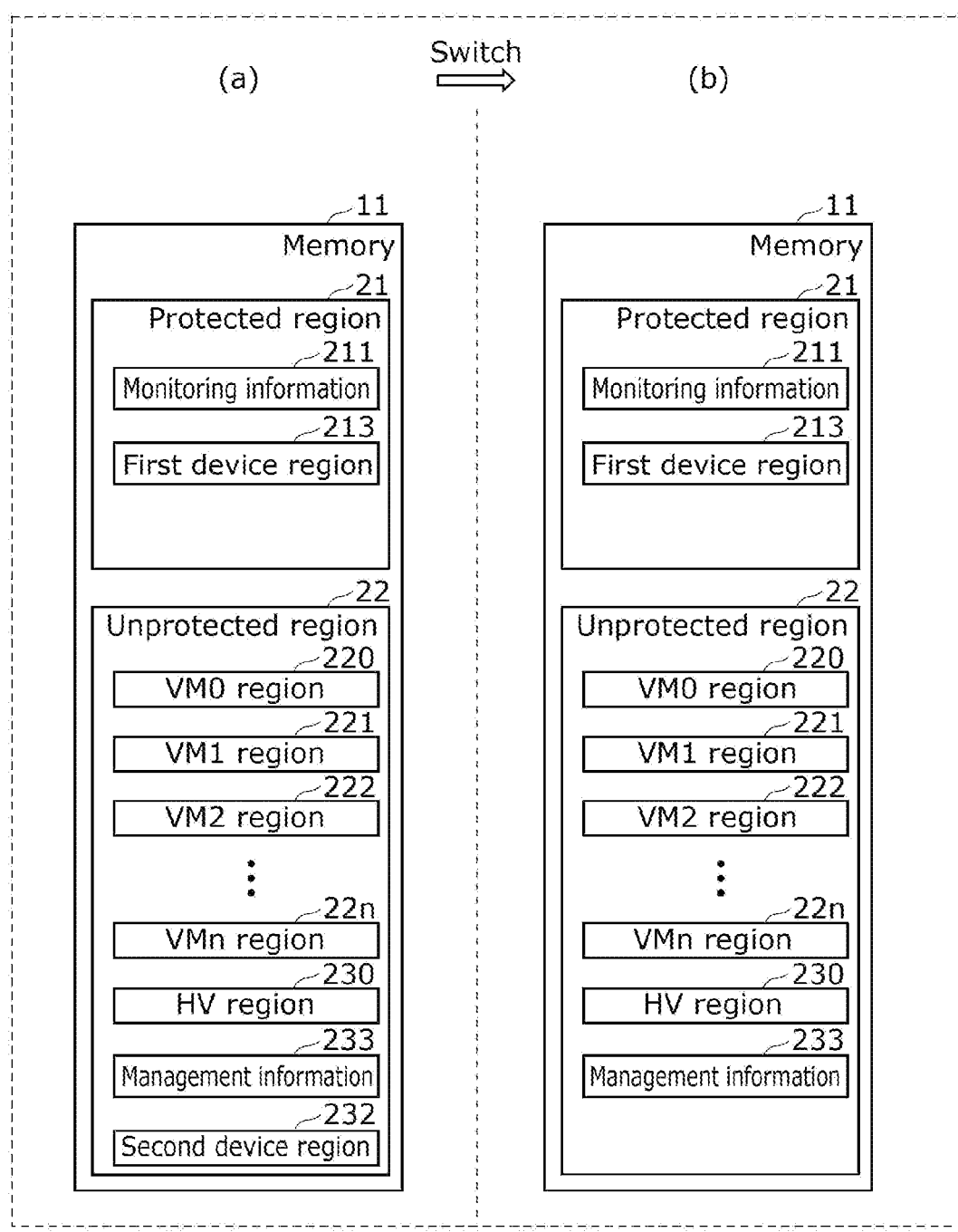
FIG. 11 is an explanatory drawing illustrating locations of device regions in a memory in Embodiment 3.

FIG. 11 is an explanatory drawing illustrating locations of device regions in memory 11 in the present embodiment.

Part (a) of FIG. 11 illustrates first locations of device regions in memory 11. The locations illustrated in (a) of FIG. 11 are locations of device regions in memory 11 when monitor 43 determines that a monitoring target has no anomaly. In other words, the locations illustrated in (a) of FIG. 11 are in memory 11 before switch 44B switches the state.

Part (a) of FIG. 11 shows the same state as that of memory 11 illustrated in FIG. 9, and first device region 213 is located in protected region 21, whereas second device region 232 is located in unprotected region 22.

Part (b) of FIG. 11 illustrates a second location of a device region in memory 11. The location illustrated in (b) of FIG. 11 is a location of a device region in memory 11 when monitor 43 determines that a monitoring target has an anomaly. In other words, a location illustrated in (b) of FIG. 11 is that in memory 11 after switch 44B switches the state.

As illustrated in (b) of FIG. 11, after switch 44B switches the state, first device region 213 is disposed, whereas second device region 232 is eliminated.

In this manner, when processor 12 is operating in the normal mode, communication using communication device 13 can be prohibited, or in other words, second device controller 32A can be disabled.

Processing performed by information processing apparatus 10B having a configuration as above is to be described.

Figure 12:
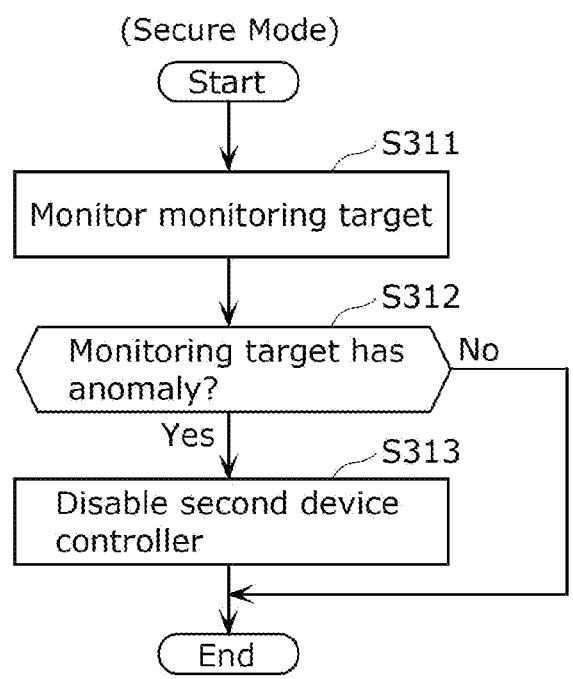
FIG. 12 is a flowchart illustrating processing performed by the information processing apparatus according to Embodiment 3.

FIG. 12 is a flowchart illustrating processing performed by information processing apparatus 10B according to the present embodiment.

As illustrated in FIG. 12, monitor 43 monitors a memory region that is a monitoring target in step S311.

In step S312, monitor 43 determines whether the memory region that is a monitoring target in the monitoring in step S311 has an anomaly. If monitor 43 determines that an anomaly is occurring (Yes in step S312), the processing proceeds to step S313, otherwise (No in step S312), a series of the processes illustrated in FIG. 12 ends.

In step S313, switch 44B changes management information 233 to disable second device controller 32A. Upon the end of step S313, information processing apparatus 10B ends the series of the processes illustrated in FIG. 12.

When information processing apparatus 10B determines that a monitoring target has an anomaly by performing the series of the processes illustrated in FIG. 12, information processing apparatus 10B performs control to prohibit communication by the device controller (that is, second device controller 32A) that operates in the normal mode, and to allow communication by the device controller (that is, first device controller 41) that operates in the secure mode. Accordingly, this avoids communication by the device controller that operates in the secure mode being prevented by communication by the device controller that operates in the normal mode, and prevention of outputting a monitoring result to the outside is further inhibited.

Embodiment 4

The present embodiment describes another aspect of, for instance, an information processing apparatus that inhibits prevention of outputting a monitoring result to the outside.

Information processing apparatus 10C according to the present embodiment can communicate with an external apparatus by, out of applications operating in the normal more, a specific application controlling communication device 13 using first device controller 41 that operates in a secure mode.

Figure 13:
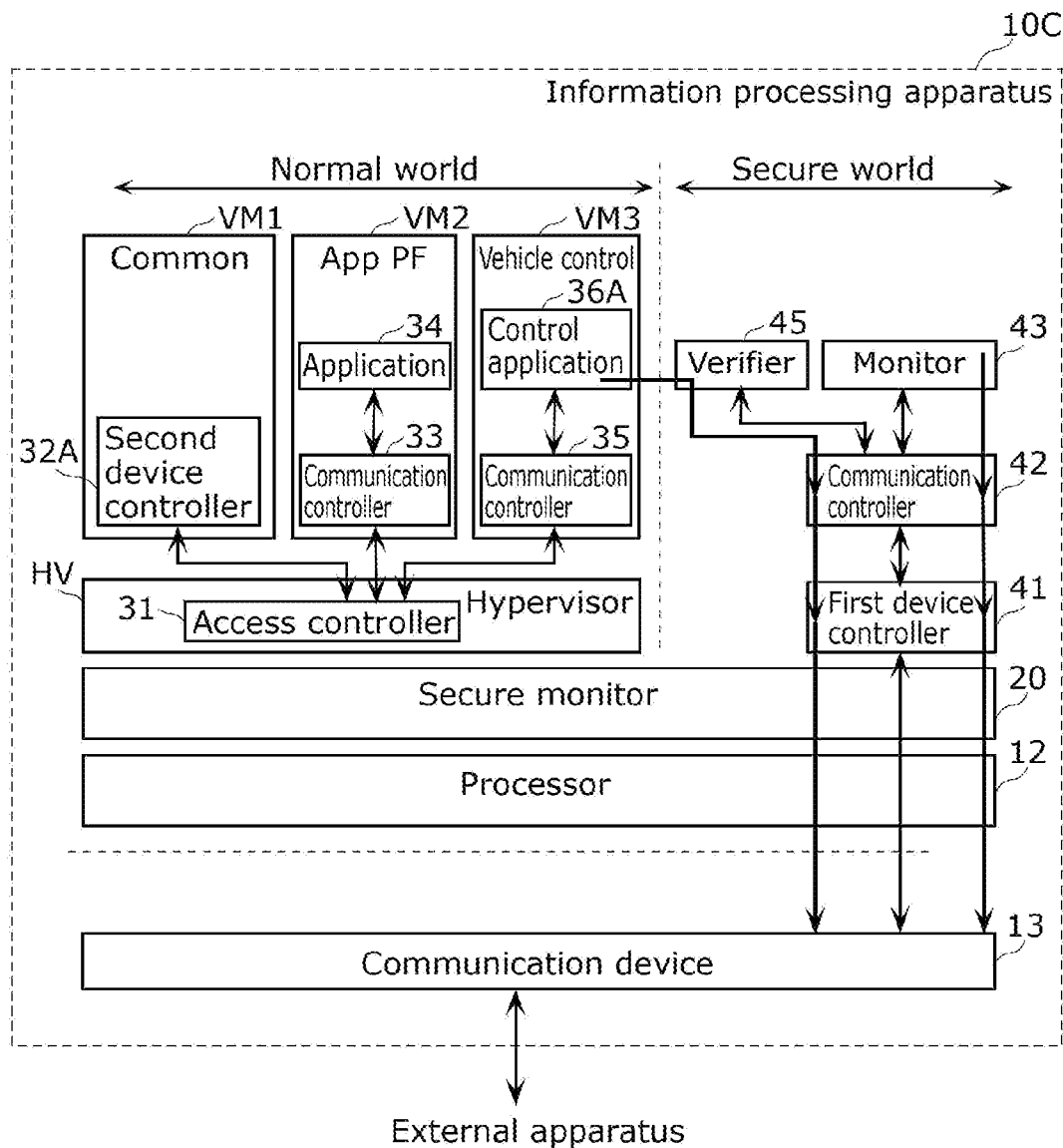
FIG. 13 is a schematic diagram conceptually illustrating a configuration of an information processing apparatus according to Embodiment 4.

FIG. 13 is a schematic diagram conceptually illustrating a configuration of information processing apparatus 10C according to the present embodiment.

Information processing apparatus 10C is similar to information processing apparatus 10 according to Embodiment 1, but includes verifier 45 that operates in the secure mode.

Verifier 45 is a functional unit that performs verification with regard to control application 36A. Specifically, when verifier 45 verifies that a digital signature added to data output by control application 36A or behavior of control application 36A is appropriate, control application 36A allows controlling communication device 13 using first device controller 41. Accordingly, control application 36A can communicate with the external apparatus using first device controller 41 that operates in the secure mode.

The following describes (1) the case where verifier 45 verifies a digital signature and (2) the case where verifier 45 verifies behavior of control application 36A.

(1) The Case Where Verifier 45 Verifies Digital Signature

Figure 14:
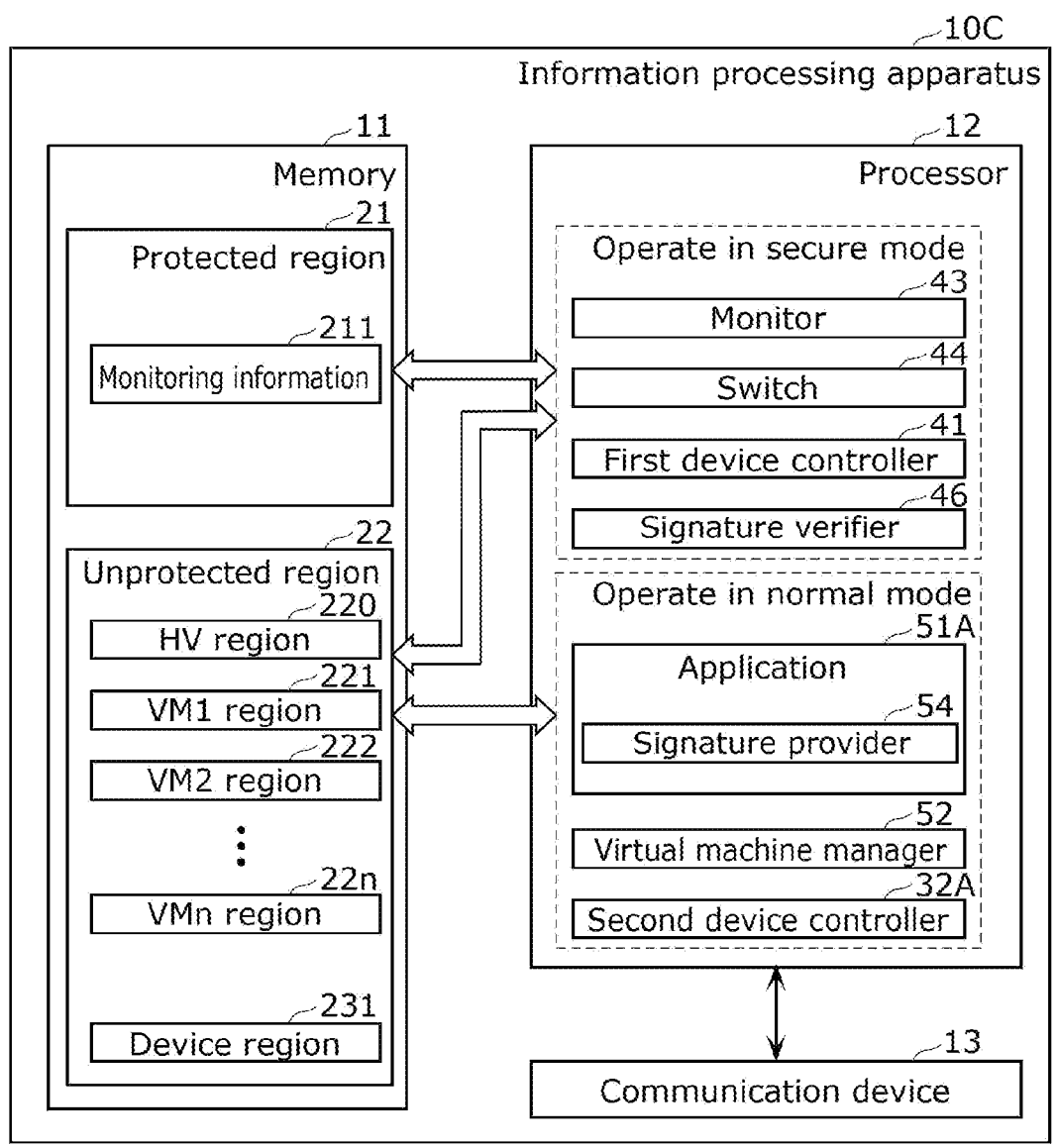
FIG. 14 is a schematic diagram illustrating a first example of a functional configuration of the information processing apparatus according to Embodiment 4.

FIG. 14 is a schematic diagram illustrating a first example of a functional configuration of information processing apparatus 10C according to the present embodiment.

As illustrated in FIG. 14, information processing apparatus 10C includes memory 11, processor 12, and communication device 13.

Memory 11 includes protected region 21 and unprotected region 22.

Protected region 21 includes monitoring information 211. Unprotected region 22 includes HV region 220, VM1 region 221, VM2 region 222, . . . , and VMn region 22n.

Processor 12 executes a program using memory 11, to implement signature verifier 46 and signature provider 54. Signature verifier 46 is a functional unit implemented by processor 12 operating in the secure mode, and an example of verifier 45.

Signature provider 54 is a functional unit implemented by processor 12 operating in the normal mode.

Signature provider 54 is a functional unit that application 51 includes, and adds a digital signature to data that application 51A is to output to the external apparatus. Signature provider 54 obtains data that application 51A is to output to the external apparatus, creates a digital signature using a secret key of application 51A based on the obtained data, and adds the created digital signature to the data. Application 51A provides signature verifier 46 with the data to which the digital signature is added by signature provider 54.

Signature verifier 46 is a functional unit that obtains the data provided by application 51A and having a digital signature added, and verifies the obtained digital signature using a public key of application 51A. Signature verifier 46 transmits data having a digital signature successfully verified, by controlling communication device 13 using first device controller 41. Note that signature verifier 46 controls communication device 13 so as not to transmit data having a digital signature unsuccessfully verified.

In this manner, application 51A can communicate with the external apparatus using first device controller 41 that operates in the secure mode, only when data is determined to be authenticated by utilizing verification that uses a digital signature.

(2) The Case Where Verifier 45 Verifies Behavior of Control Application 36A

Figure 15:
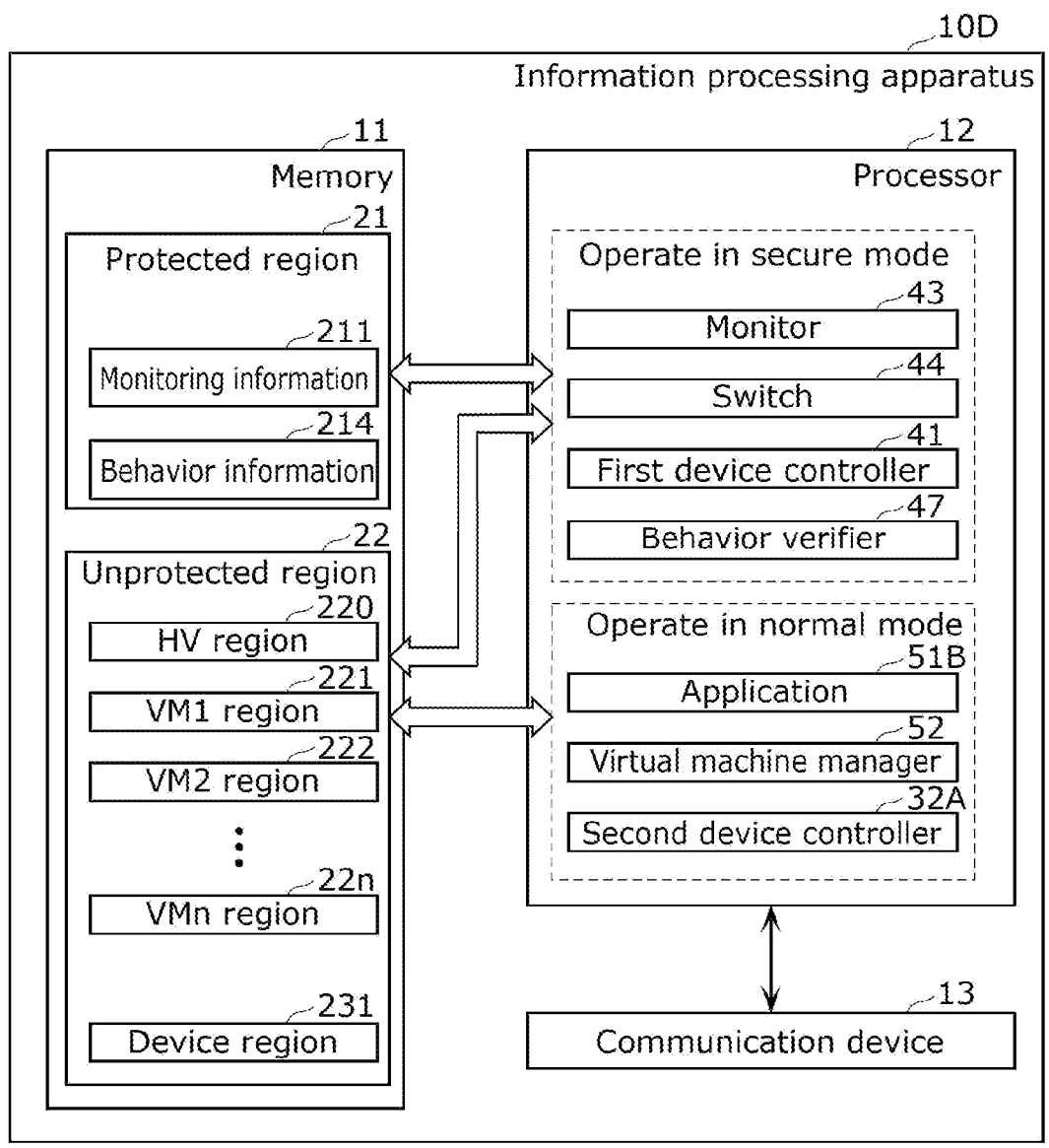
FIG. 15 is a schematic diagram illustrating a second example of a functional configuration of the information processing apparatus according to Embodiment 4.

FIG. 15 is a schematic diagram illustrating a second example of a functional configuration of information processing apparatus 10D according to the present embodiment.

As illustrated in FIG. 15, information processing apparatus 10D includes memory 11, processor 12, and communication device 13.

Memory 11 includes protected region 21 and unprotected region 22.

Protected region 21 includes monitoring information 211 and behavior information 214.

Behavior information 214 is information indicating a condition showing that behavior is appropriate (an appropriate behavior condition). Behavior information 214 includes, for instance, information indicating time intervals at which application 51 transmits predetermined information and/or information indicating the size of a communication packet that application 51 transmits.

Unprotected region 22 includes HV region 220, VM1 region 221, VM2 region 222, . . . , VMn region 22n, and device region 231.

Processor 12 executes a program using memory 11, to implement behavior verifier 47 and application 51B. Behavior verifier 47 is a functional unit implemented by processor 12 operating in the secure mode, and is an example of verifier 45. Application 51B is a functional unit implemented by processor 12 operating in the normal mode.

Application 51B provides behavior verifier 47 with communication data to be transmitted to the external apparatus.

Behavior verifier 47 is a functional unit that verifies behavior of application 51B. Behavior verifier 47 obtains behavior information 214 that protected region 21 has or obtains, from application 51B, data to be transmitted to the external apparatus. When the obtained data satisfies the appropriate behavior condition indicated by behavior information 214, behavior verifier 47 transmits the data by controlling communication device 13 using first device controller 41. Note that behavior verifier 47 controls communication device 13 so as not to transmit data that fails to satisfy the appropriate behavior condition.

In this manner, application 51B can communicate with the external apparatus using first device controller 41 that operates in the secure mode, only when data is determined to satisfy the appropriate behavior condition using verification based on behavior of application 51B.

Embodiment 5

The present embodiment describes another aspect of, for instance, an information processing apparatus that inhibits prevention of outputting a monitoring result to the outside.

When a monitoring target is determined to have an anomaly, information processing apparatus 10E according to the present embodiment controls operation of a vehicle, or more specifically, controls a vehicle so as to cause the vehicle to perform fallback operation.

Figure 16:
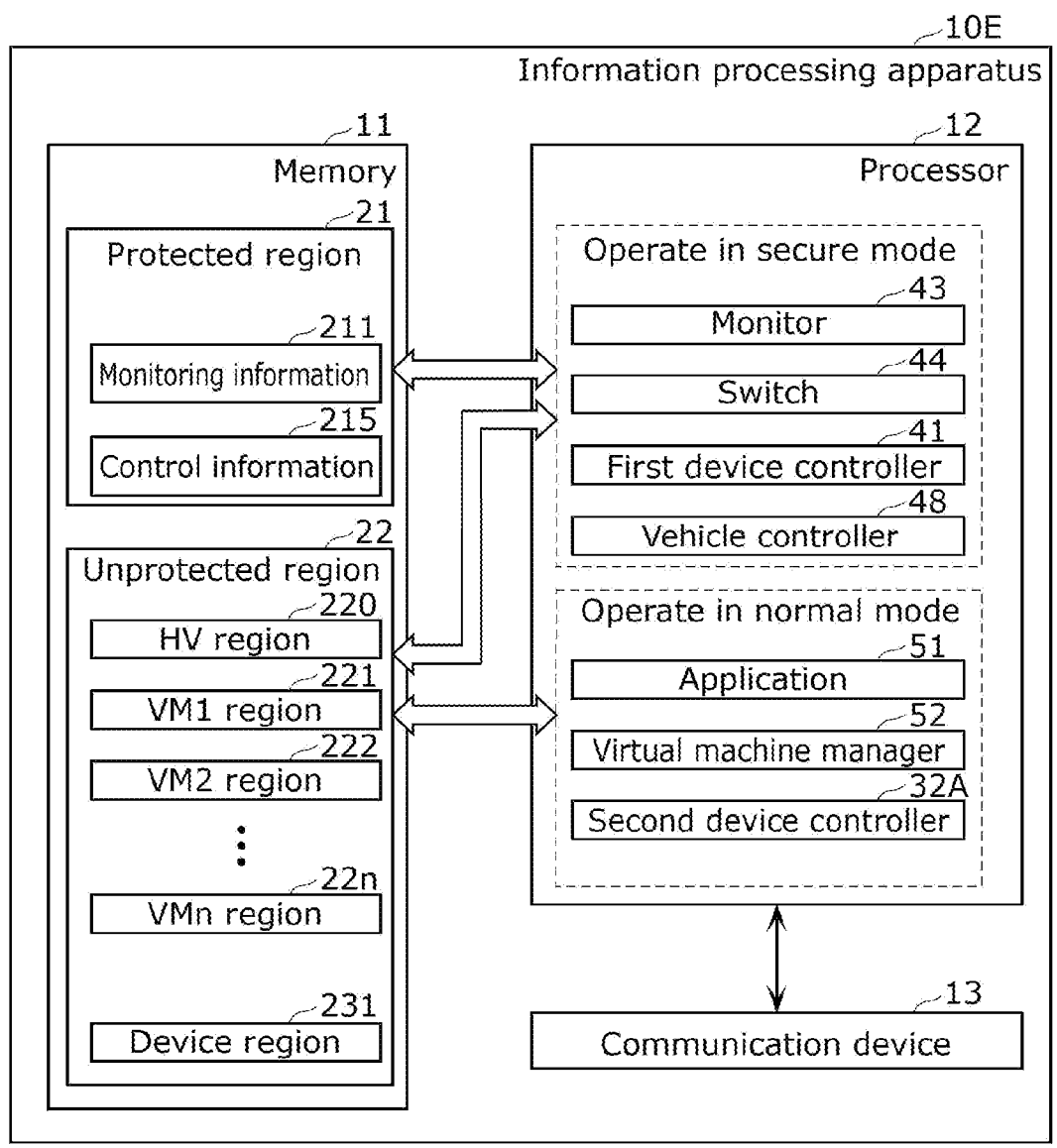
FIG. 16 is a schematic diagram illustrating a functional configuration of an information processing apparatus according to Embodiment 5.

As illustrated in FIG. 16, information processing apparatus 10E includes memory 11, processor 12, and communication device 13.

Memory 11 includes protected region 21 and unprotected region 22.

Protected region 21 includes monitoring information 211 and control information 215.

Control information 215 is for controlling a vehicle so as to cause the vehicle to perform a fallback operation (also referred to as fallback control). The fallback control includes, for example, control to enable only minimum functions for a vehicle to drive and disable other functions, control to decrease the speed of a vehicle, and/or control to cause a vehicle to stop at a safe spot on a road.

Processor 12 executes a program using memory 11, to implement vehicle controller 48. Vehicle controller 48 is a functional unit implemented by processor 12 operating in the secure mode.

When switch 44 switches from control by second device controller 32A to control by first device controller 41, vehicle controller 48 obtains control information 215 for fallback control of a vehicle, and controls the vehicle in accordance with obtained control information 215.

In this manner, information processing apparatus 10E can perform fallback control on a vehicle when an anomaly of a memory is detected.

As described above, each of the information processing apparatuses according to the above embodiments can control the communication device by the processor operating in the first mode so as to communicate with the external apparatus. If the processor can only control the device by operating in the second mode and communicate with the external apparatus, in case the device or a function used for communication using the device is attacked by a malicious application, communication with the external apparatus is prevented. Such a malicious application is assumed to operate in the second mode. In contrast, according to the information processing apparatus according to one of the above aspects, the processor operates in the first mode to control the device so as to communicate with the external apparatus, and thus prevention of communication by a malicious application that operates in the second mode can be inhibited. Accordingly, the information processing apparatus according to the aspect can inhibit prevention of outputting a monitoring result to the outside.

Further, the information processing apparatus can switch from a state of controlling the device in the second mode to a state of controlling the device in the first mode, and thus can perform operation for communication in the second more at an ordinary time and controlling the device in the first mode when it is necessary to control the device in the first mode. Accordingly, this yields advantageous effects of performing processing of controlling the device in the first mode using less computer resources and/or consuming less power. Thus, the information processing apparatus can inhibit prevention of outputting a monitoring result to the outside while using less computer resources and/or consuming less power.

When a region of the memory that is a monitoring target has an anomaly, the information processing apparatus switches the state to a state of controlling the device in the first mode, and thus can more securely transmit information indicating that an anomaly is occurring to the external apparatus. Accordingly, the information processing apparatus can more securely inhibit prevention of outputting a monitoring result to the outside.

Further, when switching the state to a state of controlling the device in the first mode, the information processing apparatus prohibits controlling the device in the second mode, and thus can inhibit prevention of communication, which is executed by controlling the device in the first mode, by communication executed by controlling the device in the second mode. Accordingly, the information processing apparatus can more securely inhibit prevention of outputting a monitoring result to the outside.

Further, the information processing apparatus controls the device in the first mode using the protected region of the memory, and controls the device in the second mode using the unprotected region of the memory. Accordingly, the information processing apparatus can inhibit prevention of outputting a monitoring result to the outside.

Further, the information processing apparatus controls the device in the first mode or the second mode using the unprotected region of the memory. Accordingly, the information processing apparatus can more readily inhibit prevention of outputting a monitoring result to the outside.

Further, the information processing apparatus verifies in the first mode a digital signature added to data by an application that operates in the second mode and transmits data successfully verified, and thus can transmit data that an authenticated application is to transmit, by controlling the device in the first mode. Thus, the information processing apparatus can inhibit both prevention of outputting a monitoring result to the outside and prevention of communication by an authenticated application.

Further, the information processing apparatus verifies in the first mode behavior of an application that operates in the second mode and transmits data successfully verified, and thus can transmit data that an authenticated application is to transmit, by controlling the device in the first mode. Thus, the information processing apparatus can inhibit both prevention of outputting a monitoring result to the outside and prevention of communication by an authenticated application.

Furthermore, the information processing apparatus can further perform fallback control on a vehicle when switching the control of the device from the first mode to the second mode. Accordingly, the information processing apparatus can control the vehicle so as to cause the vehicle to safely stop. Thus, the information processing apparatus can inhibit prevention of outputting a monitoring result to the outside, while causing the vehicle to safely stop.

Further, the information processing apparatus can inhibit prevention of outputting a monitoring result to the outside using the processor that switches between operation in the first mode and operation in the second mode in a time-sharing manner.

Further, the information processing apparatus can inhibit prevention of outputting a monitoring result to the outside using the processor that includes a plurality of cores including a core that operates in the first mode and a core that operates in the second mode.

An ECU that is the information processing apparatus can inhibit prevention of outputting a monitoring result to the outside.

Note that each of the elements in the embodiments may be configured of exclusive hardware or may be implemented by executing a software program suitable for the element. Each of the elements may be implemented by a program executor such as a CPU or a processor reading and executing a software program recorded on a recording medium such as a hard disc or a semiconductor memory. Here, the software program that implements the apparatuses according to the above embodiments is a program as follows.

Specifically, this program causes a computer to execute an information processing method executed by an information processing apparatus that includes: a device that communicates with an external apparatus outside the information processing apparatus; a memory that includes a protected region and an unprotected region; and a processor that operates in a first mode and a second mode, the first mode being a mode in which access to the protected region of the memory and access to the unprotected region of the memory are allowed, the second mode being a mode in which access to the protected region of the memory is prohibited and access to the unprotected region of the memory is allowed, the information processing method including: controlling the device by the processor operating in the first mode; causing one or more virtual machines to operate by the processor operating in the second mode; and controlling the device by the processor operating in the second mode.

The above has given a description of the information processing apparatuses according to one or more aspects, based on the embodiments, yet the present disclosure is not limited to these embodiments. Various modifications to the embodiments that may be conceived by those skilled in the art and combinations of elements in different embodiments may be included within the scope of the one or more aspects, as long as the modifications and the combinations do not depart from the spirit of the present disclosure.

While various embodiments have been described herein above, it is to be appreciated that various changes in form and detail may be made without departing from the spirit and scope of the present disclosure as presently or hereafter claimed.

Further Information About Technical Background to This Application

The disclosure of the following patent application including a specification, drawings and claims are incorporated herein by reference in its entirety: Japanese Patent Application No. 2020-154123 filed on Sep. 14, 2020.

INDUSTRIAL APPLICABILITY

The present disclosure is applicable to an anomaly detection apparatus in a virtual machine environment.

The invention claimed is:

1. An information processing apparatus, comprising:
a device that communicates with an external apparatus, the external apparatus being outside the information processing apparatus;
a memory that includes a protected region and an unprotected region;
a processor that operates in a first mode and a second mode, the first mode allowing access to the protected region of the memory and allowing access to the unprotected region of the memory, the second mode prohibiting access to the protected region of the memory and allowing access to the unprotected region of the memory;
a first controller that controls the device in response to the processor operating in the first mode;
a virtual machine manager that is a hypervisor, the hypervisor causing one or more virtual machines to operate in response to the processor operating in the second mode; and
a second controller that controls the device in response to the processor operating in the second mode.

2. The information processing apparatus according to claim 1, further comprising:
a switch that switches, in response to the processor operating in the first mode, control of the device from control by the second controller to control by the first controller.

3. The information processing apparatus according to claim 2, further comprising:
a monitor that, in response to the processor operating in the first mode, monitors a region of the memory as a monitoring target, and determines whether the monitoring target has an anomaly, the region being allocated to the virtual machine manager,
wherein, when the monitor determines that the monitoring target has an anomaly, the switch switches control of the device, when the monitor communicates with the external apparatus, from the control by the second controller to the control by the first controller.

4. The information processing apparatus according to claim 2,
wherein the switch further performs control to prohibit the control of the device by the second controller when the switch switches from the control by the second controller to the control by the first controller.

5. The information processing apparatus according to claim 1,
  wherein the first controller controls the device using a first device region included in the protected region of the memory, and
  the second controller controls the device using a second device region included in the unprotected region of the memory.

6. The information processing apparatus according to claim 1,
  wherein the first controller controls the device using a second device region included in the unprotected region of the memory, and
  the second controller controls the device using the second device region of the memory.

7. The information processing apparatus according to claim 1, further comprising:
  an application that, in response to the processor operating in the second mode, performs predetermined processing and adds a digital signature to data that the application is to transmit to the external apparatus; and
  a signature verifier that, in response to the processor operating in the first mode, receives the data to which the application has added the digital signature, and transmits the data to the external apparatus when the digital signature is successfully verified.

8. The information processing apparatus according to claim 1, further comprising:
  an application that, in response to the processor operating in the second mode, performs predetermined processing and generates one or more data items that the application is to transmit to the external apparatus; and
  a behavior verifier that, in response to the processor operating in the first mode, receives the one or more data items generated by the application, obtains, from the protected region of the memory, an appropriate behavior condition defining appropriate behavior of the application concerning communication, and when the behavior verifier determines that at least one data item out of the one or more data items satisfies the appropriate behavior condition, transmits the at least one data item to the external apparatus.

9. The information processing apparatus according to claim 2, further comprising:
  a vehicle controller that controls a vehicle,
  wherein, when the switch switches from the control by the second controller to the control by the first controller, the vehicle controller obtains, from the protected region of the memory, control information for fallback control of the vehicle, and controls the vehicle in accordance with the control information obtained from the protected region of the memory.

10. The information processing apparatus according to claim 1,
  wherein the processor switches between operation in the first mode and operation in the second mode in a time-sharing manner.

11. The information processing apparatus according to claim 1,
  wherein the processor includes a plurality of cores,
  at least one of the plurality of cores operates in the first mode, and
  at least one of the plurality of cores that is not operating in the first mode operates in the second mode.

12. The information processing apparatus according to claim 1,
  wherein the information processing apparatus is an electronic control unit (ECU) provided in a vehicle.

13. An information processing method executed by an information processing apparatus, the information processing apparatus including:
  a device that communicates with an external apparatus, the external apparatus being outside the information processing apparatus;
  a memory that includes a protected region and an unprotected region; and
  a processor that operates in a first mode and a second mode, the first mode allowing access to the protected region of the memory and allowing access to the unprotected region of the memory, the second mode prohibiting access to the protected region of the memory and allowing access to the unprotected region of the memory,
  the information processing method comprising:
    controlling a first controller to control the device in response to the processor operating in the first mode;
    causing a virtual machine manager, which is hypervisor, to cause one or more virtual machines to operate in response to the processor operating in the second mode; and
    controlling a second controller to control the device in response to the processor operating in the second mode.

14. A non-transitory computer-readable recording medium having recorded thereon a program that causes a computer to execute the information processing method according to claim 13.

* * * * *